United States Patent
Biernat et al.

(10) Patent No.: US 6,368,008 B1
(45) Date of Patent: Apr. 9, 2002

(54) SEALED EDGE JOINT BETWEEN TWO METAL PANELS

(75) Inventors: David M. Biernat, Grosse Pointe Park; Dennis D Davidson, Troy; William A Marttila, Rochester; Paul J. Belanger, Lake Orion, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/578,343

(22) Filed: May 24, 2000

(51) Int. Cl.[7] .................................................. F16B 5/00
(52) U.S. Cl. .......................... 403/267; 403/335; 29/458
(58) Field of Search ................................ 403/267, 270, 403/271, 272, 335, 336, 265; 228/136, 137; 29/458, 469.5, 509; 156/196, 216, 295

(56) References Cited

U.S. PATENT DOCUMENTS

| | | | |
|---|---|---|---|
| 2,591,994 A | * 4/1952 | Alexander | 228/137 |
| 3,680,910 A | * 8/1972 | Stanner | 296/29 |
| 4,131,980 A | 1/1979 | Zinnbauer | 29/463 |
| 4,227,824 A | * 10/1980 | Ikawa | 403/271 |
| 4,470,717 A | * 9/1984 | Bruhnke et al. | 403/271 |
| 4,719,689 A | 1/1988 | Yamamoto et al. | |
| 4,738,560 A | * 4/1988 | Brussow et al. | 403/268 |
| 4,916,284 A | * 4/1990 | Petrick | 219/121.64 |
| 5,237,734 A | * 8/1993 | Polon | 29/513 |
| 5,394,754 A | 3/1995 | Herring, Jr. | 73/826 |
| 5,470,416 A | 11/1995 | Herring, Jr. et al. | |
| 5,476,889 A | 12/1995 | Owen | |
| 5,580,907 A | 12/1996 | Savin | |
| 5,632,413 A | 5/1997 | Herring, Jr. et al. | 222/1 |
| 5,645,364 A | * 7/1997 | Hodozuka et al. | 403/270 |
| 5,720,144 A | 2/1998 | Knudson et al. | 52/731.9 |
| 5,730,446 A | 3/1998 | Taylor et al. | |
| 5,749,992 A | 5/1998 | Eklund et al. | |
| 5,871,668 A | 2/1999 | Heinmann et al. | |
| 5,964,979 A | 10/1999 | George et al. | |
| 5,979,794 A | * 11/1999 | DeFillipi et al. | 239/135 |
| 6,000,118 A | 12/1999 | Biernat et al. | |
| 6,029,334 A | * 2/2000 | Hartley | 29/464 |

* cited by examiner

*Primary Examiner*—Harry C. Kim
(74) *Attorney, Agent, or Firm*—Mark P Calcaterra

(57) ABSTRACT

A vehicle closure panel assembly having an outer panel and an inner panel. The outer panel has a flange along one edge which is folded over a flange of the inner panel. A metal coating provides a seal between the edge of the flange of the outer panel and the flange of the inner panel. The coating is made of metal and is sprayed on. The metal coating provides a mechanical and metallurgical bond and may offer sacrificial protection against corrosion and instantaneous or immediate bonding.

10 Claims, 1 Drawing Sheet

SEALED EDGE JOINT BETWEEN TWO METAL PANELS

This invention relates generally to a sealed edge joint between two metal panels, for example, an edge joint between outer and inner panels of a vehicle closure panel assembly.

BACKGROUND OF THE INVENTION

At the present time, a sealed joint between outer and inner panels of a vehicle closure panel assembly is provided by an organic-based vinyl plastisol sealant. The sealant is applied over the hem flange of the closure panel assembly typically after the first paint primer application and prior to application of a color coat to the closure panel assembly. The sealant is cured during the subsequent paint bake. The sealant is typically applied manually and is intended to resist corrosion by blocking electrolytes from entering the hem flange fold.

This edge seal has several disadvantages. If a manual application is performed, the sealant is not always uniformly applied to all areas requiring protection and it is often difficult to reach all areas of the closure panel assembly requiring protection. An automated application requires expensive capital equipment. The sealant adds little or no strength to the final panel assembly and does not provide sacrificial corrosion protection.

A sealed joint at the hem flange of a vehicle closure panel assembly has also been formed by a heat-curable resin coating as disclosed in U.S. Pat. No. 6,000,118. The closure is painted after the joint is sealed, and the coating is cured as part of the painting and baking of the paint.

SUMMARY OF THE INVENTION

In accordance with the present invention, a metal coating is provided to seal the edge of the hem flange. Preferably the metal coating is zinc or a zinc/ceramic alloy. The metal coating is mechanically sprayed on by a jet stream of metal particles.

The sprayed metal coating acts as a physical barrier or seal to prevent the entry into the hem fold of corrosion electrolytes (for example, water, salt, etc.) and also may offer sacrificial protection against corrosion. The sprayed metal coating has also been found to be compatible with downstream automotive assembly processes, including painting of the panel assembly. The sprayed metal coating can be subsequently painted over and will adhere to the paint and to the panels upon which it is sprayed.

The metal coating can be sprayed to different film thicknesses to accommodate variations in the hem tightness and panel thickness. The sprayed metal coating resists relative shifting between the door panel parts because it sets up immediately upon being sprayed on and forms a metallurgical and/or mechanical bond, thereby eliminating the necessity for welding processes and other techniques for stabilizing panel geometry. The metal coating can also be applied thinner than a vinyl sealant, minimizing the likelihood of interference between an opening for a closure panel and weather stripping.

One object of this invention is to provide a sealed edge joint for two metal panels, having the foregoing features and capabilities.

Another object is to provide a sprayed-on metal coating which seals and forms a mechanical and metallurgical bond.

Another object is to provide a sealed edge joint having a metal coating preferably made of zinc or zinc/ceramic alloy which provides sacrificial corrosion protection for closure panels constructed of steel.

Another object is to provide a method of making a sealed edge joint for two metal panels.

These and other objects, features and advantages of the invention will become more apparent as the following description proceeds, especially when considered with the accompanying claims and drawings.

DETAILED DESCRIPTION OF THE PREFERRED EMBODIMENT

Figure 1:
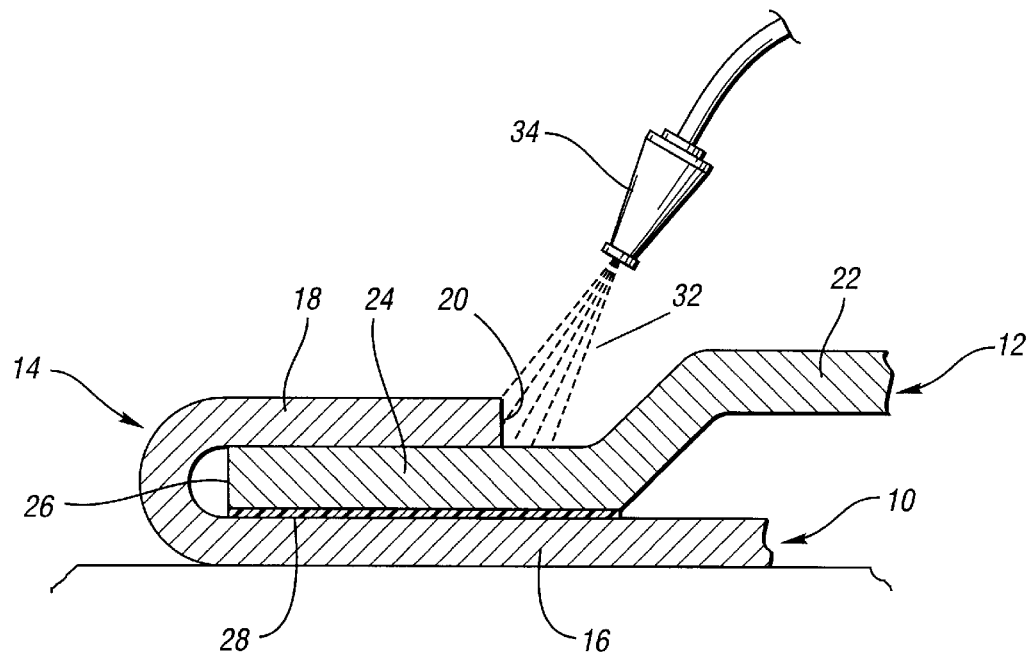
FIG. 1 is a sectional view through an edge area of two metal panels adapted to be joined together and sealed by a metal coating. Metal is shown being sprayed on at the joint between the two panels, to form the metal coating.

Referring now more particularly to the drawings, FIG. 1 shows two metal panels 10 and 12 that are to be joined together. The metal panels in this instance are the outer and inner panels of a vehicle closure panel assembly to be joined together at the edge of a hem flange 14.

The outer panel 10 has a main body portion 16, a flange 18 along a margin of the main body portion, and an edge 20.

The inner panel 12 has a main body portion 22, a flange 24 along a margin of the main body portion, and an edge 26.

The flange 24 of the inner panel 12 extends over the body portion 16 of the outer panel adjacent to the flange 18 and is secured thereto by a layer of adhesive 28. The adhesive acts as a sealant and may be made of a polymeric or elastomeric adhesive material, as for example, an epoxy or a vinyl adhesive, or adhesive elastomer.

The flange 18 of the outer panel is bent and folded over the flange 24 of the inner panel and pressed against the outer surface of the flange 24.

Figure 2:
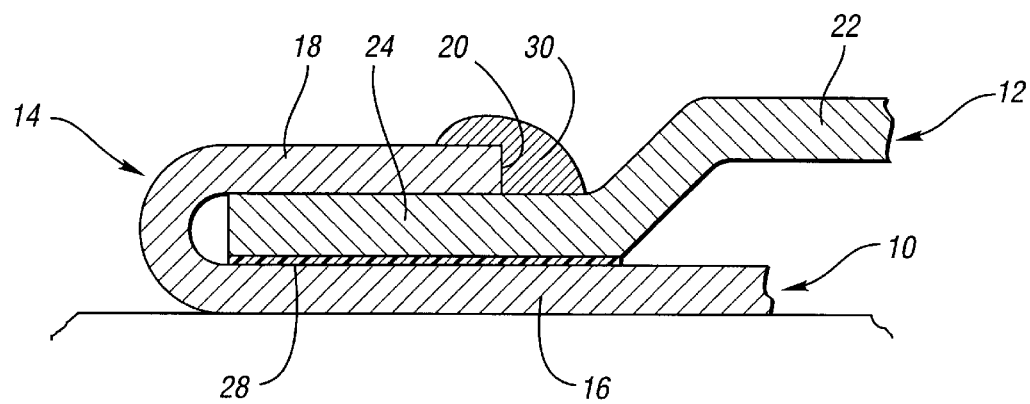
FIG. 2 is view similar to FIG. 1, showing the completed structure after the metal coating has been completely applied.

As shown in FIG. 2, a metal coating 30 in the form of a bead or strip of coating material is applied at the joint between the edge 20 along the flange 18 of the outer panel and the outer surface of the flange 24 of the inner panel. The metal coating 30 is formed by metal particles sprayed over the flange 18 of the outer panel, across the joint-forming edge 20 of the outer panel and onto the exposed outer surface of the flange 24 of the inner panel. FIG. 1 shows at 32 the metal coating being sprayed under high pressure and at a high velocity from the nozzle 34 of an applicator to build up the metal coating 30 to the thickness desired. The sprayed-on metal may, for example, initially be in powdered form or in the form of molten or semi-molten particles.

The coating 30 is made of a suitable metal, preferably zinc or zinc/ceramic alloy and provides a mechanical and metallurgical bond to the flanges 18 and 24 of the two panels across the joint therebetween at the edge 20 of the outer panel. A metal coating of this description not only provides a sealed joint preventing the entrance of corrosion electrolytes (for example, water, salt. etc.) but may also provide sacrificial protection against corrosion.

What is claimed is:

1. A sealed edge joint for two metal panels comprising,
a first metal panel having a first body portion adjacent to a first edge of said first panel and a first flange between said first body portion and said first edge, a second metal panel having a second body portion adjacent to a second edge of said second panel and a second flange between said second body portion and said second edge, said second flange of said second panel extending over said first body portion of said first panel with the second edge of said second panel adjacent to said first flange of said first panel, a layer of adhesive between and securing together said second flange of said second panel and said first body portion of said first panel, said first flange of said first panel being folded over said second flange of said second panel with the first edge of said first panel in contact with said second flange, and a metal coating along said first flange and said first edge of said first panel and said second flange of said second panel to provide a sealed joint therebetween.

2. A sealed edge joint as defined in claim 1, wherein said metal coating is formed by metal particles sprayed on said first flange and said first edge of said first panel and said second flange of said second panel, said metal coating metallurgically bonding to said first flange and said first edge and said second flange.

3. A sealed edge joint as defined in claim 1, wherein said metal coating is made of zinc.

4. A sealed edge joint as defined in claim 1, wherein said metal coating is made of zinc/ceramic alloy.

5. A sealed edge joint as defined in claim 1, wherein said metal coating is formed by metal particles sprayed on said first flange and said first edge of said first panel and said second flange of said second panel, said metal coating mechanically and metallurgically bonding to said first flange and said first edge and second flange to provide sacrificial protection against corrosion.

6. A sealed edge joint as defined in claim 5, wherein the metal coating is zinc or zinc/ceramic alloy.

7. A method of making a sealed edge joint for two metal panels comprising;

providing a first metal panel having a first body portion adjacent to a first edge of said first panel and a first flange between said first body portion and said first edge, providing a second metal panel having a second body portion adjacent to a second edge of said second panel and a second flange between said second body portion and said second edge, extending said second flange of said second panel over said first body portion of said first panel with the second edge of said second panel adjacent to said first flange of said first panel, providing a layer of adhesive between and securing together said second flange of said second panel and said first body portion of said first panel, folding said first flange of said first panel over said second flange of said second panel with the first edge of said first panel in contact with said second flange, and providing a metal coating along said first flange and said first edge of said first panel and said second flange of said second panel to provide a sealed joint therebetween.

8. A method as defined in claim 7, wherein said metal coating is formed by metal particles sprayed on said first flange and said first edge of said first panel and said second flange of said second panel to metallurgically bond said first flange to said first edge and said second flange.

9. A method as defined in claim 8, wherein said metal coating is made of zinc.

10. A method as defined in claim 8, wherein said metal coating is made of zinc/ceramic alloy.

* * * * *